350-342 SR
XR 3,723,651
SEARCH ROOM

United States Patent [19]
Gorog SUBSTITUTE FOR MISSING XR
[11] 3,723,651
[45] Mar. 27, 1973

[54] OPTICALLY-SCANNED LIQUID-CRYSTAL PROJECTION DISPLAY

[75] Inventor: Istvan Gorog, Princeton, N.J.
[73] Assignee: RCA Corporation

[22] Filed: Dec. 27, 1971
[21] Appl. No.: 212,506

[52] U.S. Cl. ....178/7.5 D, 178/7.3 D
[51] Int. Cl. ....H04n 5/74
[58] Field of Search ....178/7.5 D, 7.3 D

[56] References Cited

UNITED STATES PATENTS

| | | | |
|---|---|---|---|
| 3,134,297 | 5/1964 | Carlson et al. | 178/7.5 D |
| 3,219,756 | 11/1965 | Roussin | 178/7.5 D |

*Primary Examiner*—Richard Murray
*Attorney*—H. Christoffersen et al.

[57] ABSTRACT

A display system is disclosed which includes a multi-layer light control panel having a first transparent electrode, a photoconductor, a normally-transparent liquid crystal, and a second transparent electrode. A laser light beam is modulated with video information and raster scanned to the photoconductor. A direct-current potential is applied across the electrodes during the scanning of a frame, so that spatial variations are created in the light transmissivity of the liquid crystal. During a first portion of a vertical retrace period, a short circuit is placed across the electrodes, and a flash lamp is projected through the light control panel to a display screen. During a second portion of the vertical retrace period, an alternating current potential is applied to the electrodes to restore the liquid crystal to its transparent condition.

4 Claims, 1 Drawing Figure

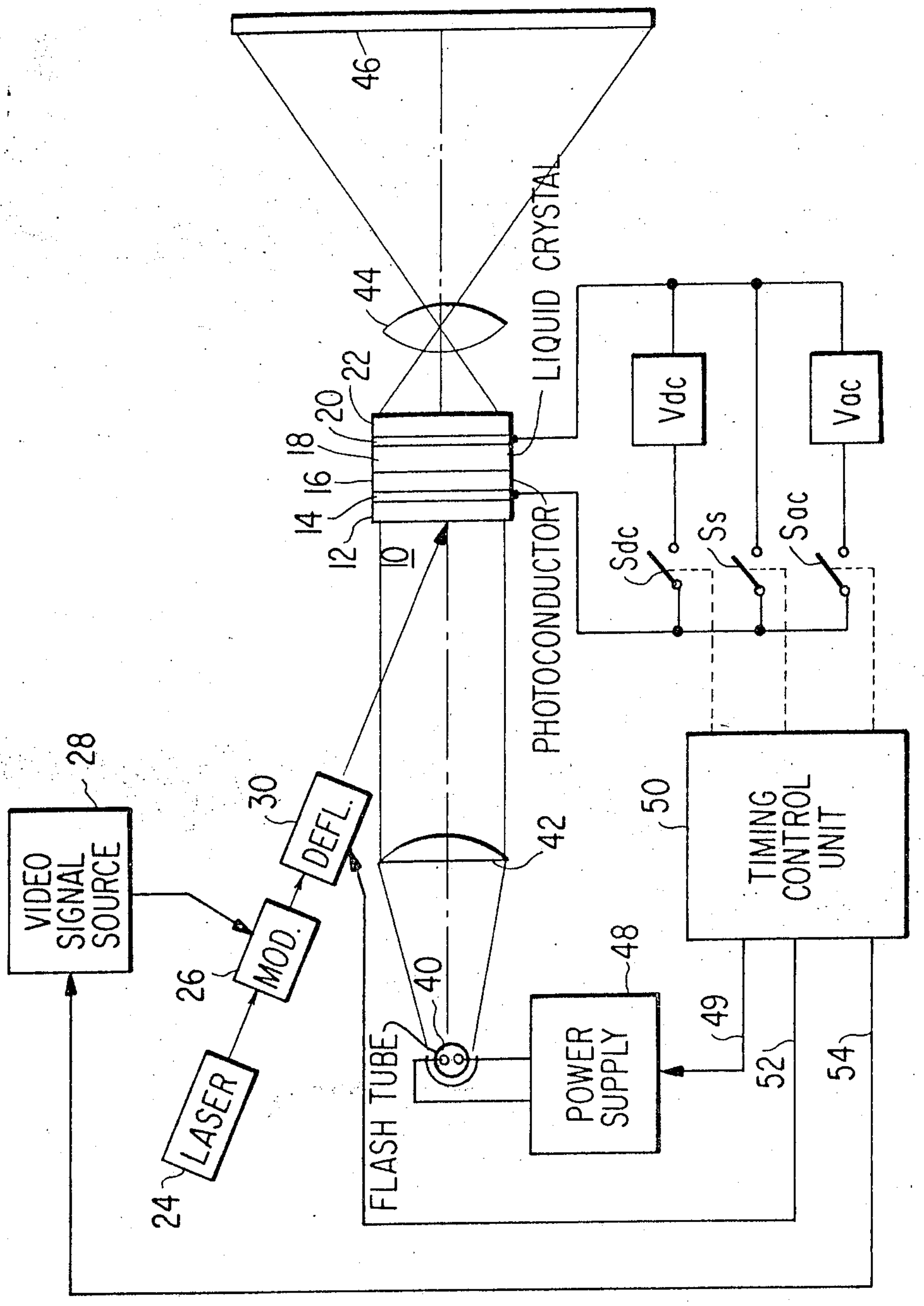
VIDEO SIGNAL SOURCE
28
LASER
24
MOD.
26
DEFL.
30
FLASH TUBE
40
42
POWER SUPPLY
48
49
52
54
TIMING CONTROL UNIT
50
PHOTOCONDUCTOR
LIQUID CRYSTAL
10
12
14
16
18
20
22
44
46
Vdc
Vac
Sdc
Ss
Sac

OPTICALLY-SCANNED LIQUID-CRYSTAL PROJECTION DISPLAY

BACKGROUND OF THE INVENTION

The display of changing information is commonly accomplished by means of a cathode ray tube in which the cathode ray is modulated with the information and deflected to scan a phosphor screen. When a large size display is desired, it is impractical to consider an evacuated envelope having a screen larger than, say, 3 feet square. Therefore, it has been proposed to construct displays including a modulated and deflected laser light beam, rather than a cathode ray. A scanned laser beam display on a passive screen of large size is limited in brightness and color by the amount and quality of light energy obtainable from suitable lasers. An active screen may be used which includes an image amplifier to which electrical energy is supplied to make the image as bright as desired. However, image amplifiers of large size are perhaps as difficult and expensive to construct as large cathode ray tubes. A system is needed, having components of reasonable size, which is capable of projecting an image onto a passive screen of any desired size. It is known that an image can be scanned by a light beam onto a panel including a photoconductor which controls a liquid crystal. The liquid crystal can act as a light valve for controlling light reflected to the viewer from a separate source near the viewer. However, such a system involves the problem of optically isolating the photoconductor from the viewing light source. A layer is needed, between the photoconductor and the liquid crystal, which is optically reflective and electrically non-conductive. Such layers are difficult to make, and thus far no success in constructing them has been reported.

SUMMARY OF THE INVENTION

The energy limitations of a scanned laser beam are overcome by employing the beam to create the image in a light valve panel, and using a separate light source for projecting the image onto a screen. A video-modulated laser beam raster scans a photoconductor and liquid crystal panel to which electrical energy is applied during the scanning. The image created in the liquid crystal is projected through the panel to a passive screen by a flash lamp energized during vertical retrace, and is then erased from the liquid crystal before the next scan. A sequence of operations is followed to prevent the projection flash light from undesirably affecting the photoconductor.

BRIEF DESCRIPTION OF THE DRAWING

The sole FIGURE of the drawing is a diagram of an optically-scanned liquid-crystal projection display constructed according to the invention.

DESCRIPTION

The system shown in the drawing includes a light amplifier and image converter panel 10 comprising a sandwich-like structure having, in the order named, a front glass support plate 12, a transparent conductive coating 14 thereon, a photoconductive layer 16, a nematic liquid-crystal composition 18, and a transparent conductive coating 20 on a back glass support plate 22.

The transparent support plates 12 and 22 may be made of glass or quartz. The transparent conductive coatings or layers 14 and 20 may be conductive thin films of conductive tin oxide. The photoconductive layer 16 may be any suitable photoconductor such as cadmium sulfide, cadmium selenide, lead sulfide, or the like, having a region of radiation sensitivity appropriate to the laser light source in the system. The liquid crystal layer 13 may be comprised of a composition such as an equal weight ratio mixture of p-m-aminoanisylidean-p'-phenylacetate, p-n-anisulidene-p'-aminophenylbutyrate and p-n-butoxybenzylidene-p'-aminophenyl-proprionate. The optical properties of the device depend upon the formation of charge carriers in the liquid crystal layer such that a current passes therethrough and creates turbulence in the activated regions of the liquid crystal layer. This turbulence causes the scattering of light in the activated regions. Alternative liquid crystal compositions are well known in the art. Care should be taken to utilize a photoconductor and liquid crystal combination having a good impedance match. Known impedance matching techniques include the addition of a resistive layer in parallel with one of the elements to change its effective impedance.

The transparent electrodes 14 and 20 in the light control panel 10 are connectable to a direct-current source of potential Vdc through a switch Sdc. The transparent electrodes are also connectable to a short circuiting switch Ss, and are connectable to an alternating-current source of potential Vac through a switch Sac.

An image is written onto the panel 10 by means of an optical scanner including a laser 24 which generates a monochromatic coherent light beam. The beam is intensily modulated by means of a light modulator 26 which operates under the control of a video signal source 28. The modulated light beam from modulator 26 is deflected by a light scanner 30 in a pattern that sweeps a raster scanned area on the photoconductor layer 16 of the panel 10. The scanning of an image onto the panel 10 may be in accordance with the standards employed in television receivers, where 60 raster scan fields are produced per second. Successive field scans are separated by vertical retrace periods, which may have a time duration of about 10 percent of the time duration of a field scan. The scanning may involve two interlaced fields per image frame in accordance with television practice.

The image projection system includes a high intensity electronic flash tube 40 from which light is connected by a condenser lens 42 and directed to the entire active surface of the light control panel 10. Image light emerging from the panel 10 is passed through a projection lens 44 to a passive display screen 46.

The flash tube 40 is energized by an electrical power supply 48 which is triggered by a signal over line 49 from a timing control unit 50. The timing control unit 50 also provides control signals over lines 52 and 54 to the deflector 30 and the video signal source 28, respectively, to accomplish a television-like presentation of optical images on the light control panel 10. The timing unit 50 also controls the switches Sdc, Ss and Sac as represented by the dashed lines going from the timing unit to the switches.

OPERATION

In the operation of the display system, light from the laser 24 is modulated by modulator 26 in accordance with a television-type video signal from source 28. The modulator operates in an inverse fashion so that black portions of the image are represented by full amplitude light, and white portions of the image are represented by zero amplitude light. The modulated light beam is deflected by deflector 30 to scan the photoconductive layer 16 in panel 10, whereby the optical image is translated to an image of varying conductivity in the photoconductor 16.

During the scanning of a field, the switch Sdc is closed so that a direct current potential is applied from source Vdc across the transparent electrodes 14 and 20. The applied potential is present across the series combination of the photoconductor 16 and the liquid crystal 18. At each elemental area of the sandwich, the voltage division across the photoconductor 16 and the liquid crystal 18 depends on the conductivity of the photoconductor 16. If the elemental area has received light from the laser beam, the local photoconductor material is conductive and the entire potential appears across the adjacent elemental area of the liquid crystal 18. This causes the liquid crystal material to have a turbulence due to the current flowing through the liquid crystal. When the liquid crystal is in a turbulent condition, it acts to scatter light projected through it. However, the scanning light from the laser 24 is not of sufficient intensity to be useful for projecting an image onto the display screen 46.

After the scanning of an image field has been completed, and a pattern of turbulence has been established in the liquid crystal 18, the switch Sdc is opened and the switch Ss is closed to apply a short circuit across the photoconductor 16 and liquid crystal 18. This is done during the vertical retrace period of the scanning procedure. The liquid crystal 18 is characterized in having an appreciable "turn-off" time. That is, the turbulence in the liquid crystal persists for an appreciable time after the direct current potential is removed. The short circuiting switch Ss serves to remove electrical charges present in the photoconductor 16 and the liquid crystal 18.

During the vertical retrace period, when the electrodes of panel 10 are short circuited, a flash of high-intensity light is projected from flash tube 40 through the panel 10 to the display screen 46. The image of turbulence in the liquid crystal 18 controls the passage of light through the panel 10 so that the image is projected on the screen 46. The flash of light applied through the photoconductor 16 renders the entire photoconductor conductive. This is equivalent to placing, for each elemental area, a short circuit across the photoconductor, between the transparent conductive layer 14 and the interface of the photoconductor and liquid crystal layers. The combination of the short circuit and the closed external shorting switch Ss clears the light control panel of stored electrical charge.

After the image has been projected by the flash tube 40, the switch Ss is opened and the switch Sac is closed to apply the potential from source Vac to the panel to clear the turbulence image in the liquid crystal 18 and render it everywhere transparent. This clearing operation is completed during the later portion of the retrace period. The switch Sac is then opened, and switch Sdc is closed in preparation for the next following raster scan of an image field by the scan laser.

The operation of the system is possible because advantage is taken of time constants of the materials involved. The photoconductor 16 momentarily receives scan light and generates charges which persist in maintaining the elemental area conductive so that the potential Vdc acts through the photoconductor on the liquid crystal to change its state. When the panel has been scanned, the liquid crystal image persists when the panel is flashed with light from the flash tube 40. The resulting conductive condition of the photoconductor 16 aids in the removal of electrical charges through the shorting switch Ss, and aids in the erasure of the liquid crystal image when the alternating current potential is applied through the switch Sac. The projection from the flash lamp of 60 images per second results, through persistance in vision, in the appearance of a continuously present image on display screen 46.

What is claimed is:

1. A display system involving raster scan periods separated by "vertical retrace" periods, comprising
   - a multi-layer light control panel including, in the order named, a first transparent electrode, a photoconductor, a normally transparent liquid crystal, and a second transparent electrode,
   - means to apply a direct-current potential across said electrodes solely during said raster scan periods,
   - a source of a light beam which is modulated with video information and raster scanned during said raster scan periods onto said photoconductor to cause spatial variations in the light transmissivity of the liquid crystal,
   - a flash lamp on one side of said light control panel and a display screen on the opposite side, and
   - means operative solely during first portions of said vertical retrace periods to connect a short circuit across said electrodes, and to energize said flash lamp to project a flash of light through said light control panel to said display screen, whereby an image is projected, said photoconductor is everywhere rendered conductive, and electric charges are removed from said photoconductor and said liquid crystal.

2. A display system as defined in claim 1 and, in addition, means operative solely during second portions of said vertical retrace periods to apply an alternating current potential to said electrodes to restore said liquid crystal to its transparent condition.

3. A display system as defined in claim 2 wherein said source of a scanned light beam and said flash lamp are on the same side of said light control panel having said first transparent electrode.

4. A display system as defined in claim 3, wherein a projection lens is included between said light control panel and said display screen.

* * * * *